(12) United States Patent
Montevirgen et al.

(10) Patent No.: US 10,331,170 B2
(45) Date of Patent: Jun. 25, 2019

(54) COMPONENT ASSEMBLY IN PRE BENT STATE

(71) Applicant: Apple Inc., Cupertino, CA (US)

(72) Inventors: Anthony S. Montevirgen, Milpitas, CA (US); David Glen Havskjold, Sunnyvale, CA (US); Emery A. Sanford, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/035,822

(22) Filed: Sep. 24, 2013

(65) Prior Publication Data

US 2015/0070826 A1 Mar. 12, 2015

Related U.S. Application Data

(60) Provisional application No. 61/875,684, filed on Sep. 9, 2013.

(51) Int. Cl.
*G06F 1/16* (2006.01)

(52) U.S. Cl.
CPC .......... *G06F 1/1637* (2013.01); *G06F 1/1656* (2013.01); *Y10T 29/49826* (2015.01)

(58) Field of Classification Search
CPC . G06F 1/1637; G06F 1/1656; Y10T 29/49826
USPC .............................. 361/679.26, 679.09, 749
See application file for complete search history.

(56) References Cited

U.S. PATENT DOCUMENTS

| | | | | |
|---|---|---|---|---|
| 3,806,400 | A * | 4/1974 | Laethem | B32B 17/10302 156/102 |
| 3,822,122 | A * | 7/1974 | Plumat et al. | B32B 1/10137 65/104 |
| 5,379,182 | A * | 1/1995 | Fujimori | G06F 1/1616 292/56 |
| 6,356,334 | B1 * | 3/2002 | Mathew | G02F 1/133308 349/149 |
| 8,336,334 | B2 | 12/2012 | Ross et al. | |
| 2008/0212271 | A1 * | 9/2008 | Misawa | G02F 1/133305 361/679.01 |
| 2009/0015747 | A1 * | 1/2009 | Nishizawa | G02F 1/133308 349/58 |
| 2009/0237874 | A1 * | 9/2009 | Prest et al. | 361/679.01 |
| 2009/0257207 | A1 * | 10/2009 | Wang | G06F 1/1626 361/752 |
| 2010/0227642 | A1 * | 9/2010 | Kim | H04M 1/72577 455/556.1 |
| 2012/0114901 | A1 * | 5/2012 | Uraji | B32B 1/00 428/121 |
| 2012/0242588 | A1 * | 9/2012 | Myers et al. | 345/173 |
| 2012/0288661 | A1 | 11/2012 | Wei | |
| 2013/0002572 | A1 * | 1/2013 | Jin et al. | 345/173 |

(Continued)

*Primary Examiner* — Rockshana D Chowdhury

(74) *Attorney, Agent, or Firm* — Brownstein Hyatt Farber Schreck, LLP

(57) ABSTRACT

A portable electronic device is provided. The portable electronic device may include a housing and a cover panel that may cover a display. The cover panel may define a pre-bent configuration prior to being coupled to the housing. Thereby, the cover panel may be elastically bent during attachment to the housing. Thus, the cover panel may include internal forces as a result of the elastic bending that prevent the cover panel from bowing outwardly from the housing. Related assemblies and methods are also provided.

14 Claims, 10 Drawing Sheets

(56) References Cited

U.S. PATENT DOCUMENTS

2013/0044282 A1\* 2/2013 Kuwabara ............. G02F 1/1333
349/96
2013/0101980 A1\* 4/2013 Domey .................. B43L 1/008
434/408

\* cited by examiner

COMPONENT ASSEMBLY IN PRE BENT STATE

CROSS-REFERENCE TO RELATED APPLICATIONS

This application claims priority to U.S. Provisional Patent Application No. 61/875,684, filed on Sep. 9, 2013, which is incorporated herein in its entirety by reference.

TECHNICAL FIELD

The present disclosure relates generally to cover panels, and more particularly to methods for forming cover panels defining a substantially flat configuration when assembled and related assemblies and portable electronic devices.

BACKGROUND

In the continuing quest for more compact devices, reduction in every dimension is sought. In this regard, the height, width, and thickness of a device each contribute to the overall size and appearance of the device. In the context of portable electronic devices, reduction in the size of border area surrounding a display may be desired in order to shrink the overall size of the device or allow for inclusion of a larger display.

However, securing a cover panel extending over the display to a housing of the portable electronic device may present challenges. In this regard, in order to provide a secure fit, features such as mechanical fasteners and/or adhesives may be employed along the lateral edges of the display. Such features take up space within the portable electronic device, contributing to an increase in the size of the border surrounding the display. Further, these features may introduce an added degree of complexity that may affect the ability of manufacturing processes to produce consistently flush cover panels with respect to the surrounding housing.

Accordingly, improved methods of coupling a cover panel to a housing may be desirable.

SUMMARY

Embodiments of the present disclosure relate to cover panels for electronic devices. In this regard, cover panels may cover a display or other portion of an electronic device. For example, the cover panel may be a glass cover panel that allows a user to view the display therethrough. However, the cover panel may tend to bow, or bend, outwardly from a housing of the electronic device due to tolerances associated with manufacturing processes.

Accordingly, embodiments of the present disclosure provide a cover panel defining a pre-bent state. Thus, when the cover panel is assembled to the housing, the cover panel may be elastically bent and coupled thereto at the longitudinal ends of the cover panel. Due to the elastic bending of the cover panel, the cover panel may include internal biasing forces that prevent the cover panel from bowing outwardly. Thus, the cover panel may define a substantially flat configuration when coupled to the housing.

The cover panel may be bent by chemically strengthening one of two outer major surfaces to a greater extent than the other major outer surface. Alternatively, the cover panel may be initially manufactured to define a bent, three-dimensional state. In an alternative embodiment, the cover panel may be coupled to a bent frame to cause the cover panel to define the pre-bent configuration.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Representative applications of systems, apparatuses, computer program products and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described in detail below, the following relates to pre-bent cover panels. It should be noted that the present description is generally provided in terms of a glass cover panel protecting a display of an electronic device. However, the pre-bent cover panels disclosed herein may be employed in various other applications. In this regard, for example, the pre-bent cover panels disclosed herein may be employed to form substantially flat front, side, or back plates for electronic devices, substrates protecting laptop or television displays, and any other embodiment of substrate.

Figure 1:
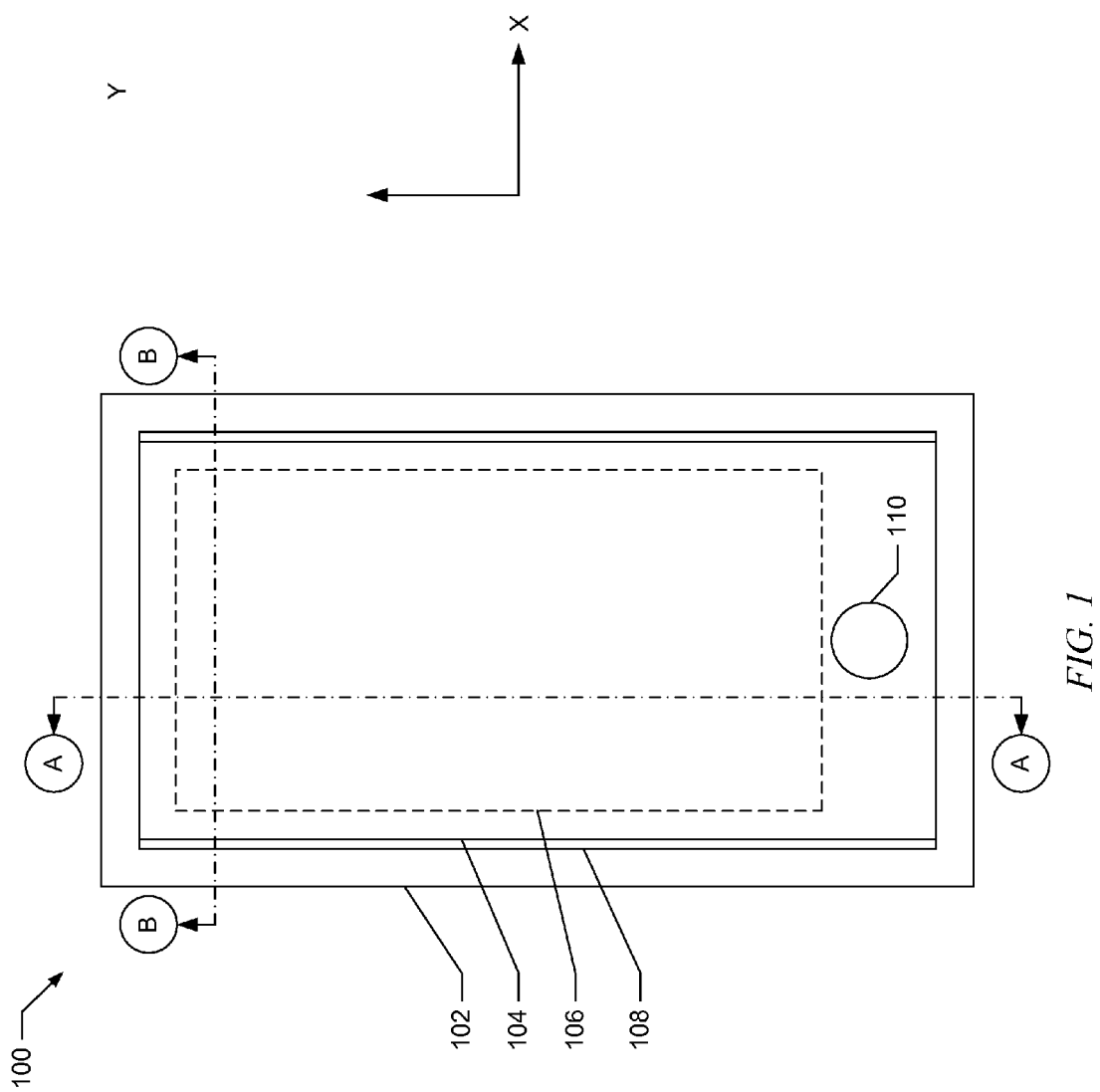
FIG. 1 illustrates a front view of a portable electronic device including a housing and a display cover according to an example embodiment of the present disclosure.

FIG. 1 illustrates an embodiment of a portable electronic device 100. For example, the portable electronic device 100 may comprise a smartphone. As illustrated, the portable electronic device 100 may include a housing 102 and a cover panel 104. The cover panel 104 may cover and protect a display 106.

The cover panel 104 may comprise a glass cover panel in some embodiments. Use of a glass cover panel may be preferable in some embodiments due to glass defining desirable optical and physical properties. Note, however, that although the present disclosure generally describes usage glass cover panels to protect the display 106, the cover panel 104 may comprise various other materials in other embodiments (e.g., crystal, acrylic, plastic, etc.).

Further, embodiments of cover panels may not cover displays in all embodiments. Thus, in embodiments of cover panels that do not cover displays, various opaque materials may be employed, such as metals. Accordingly, it should be understood that reference to a glass cover panel is for example purposes only, and the cover panel may comprise various other materials in accordance with embodiments of the present disclosure.

In some embodiments a frame 108 may be positioned at an interface between the cover panel 104 and the housing 102. As illustrated, the frame 108 may extend along the lateral sides of the cover panel 104. In other embodiments the frame may additionally or alternatively extend along the longitudinal ends of the cover panel.

As further illustrated in FIG. 1, the portable electronic device 100 may include a button 110 in some embodiments. Further, the portable electronic device 100 may include a plurality of electronic components received within the housing 102. For example, the electronic components may include a battery, a processor, a memory device, audio input and output devices, an antenna, a camera, a motion sensor, a vibration emission device, and/or various other electronic components.

Various embodiments of portable electronic devices are described below. These portable electronic devices may generally include features as described above with respect to the embodiment of the portable electronic device 100 illustrated in FIG. 1. Differences with respect to the various embodiments of portable electronic devices provided herein are highlighted below.

Figure 2:
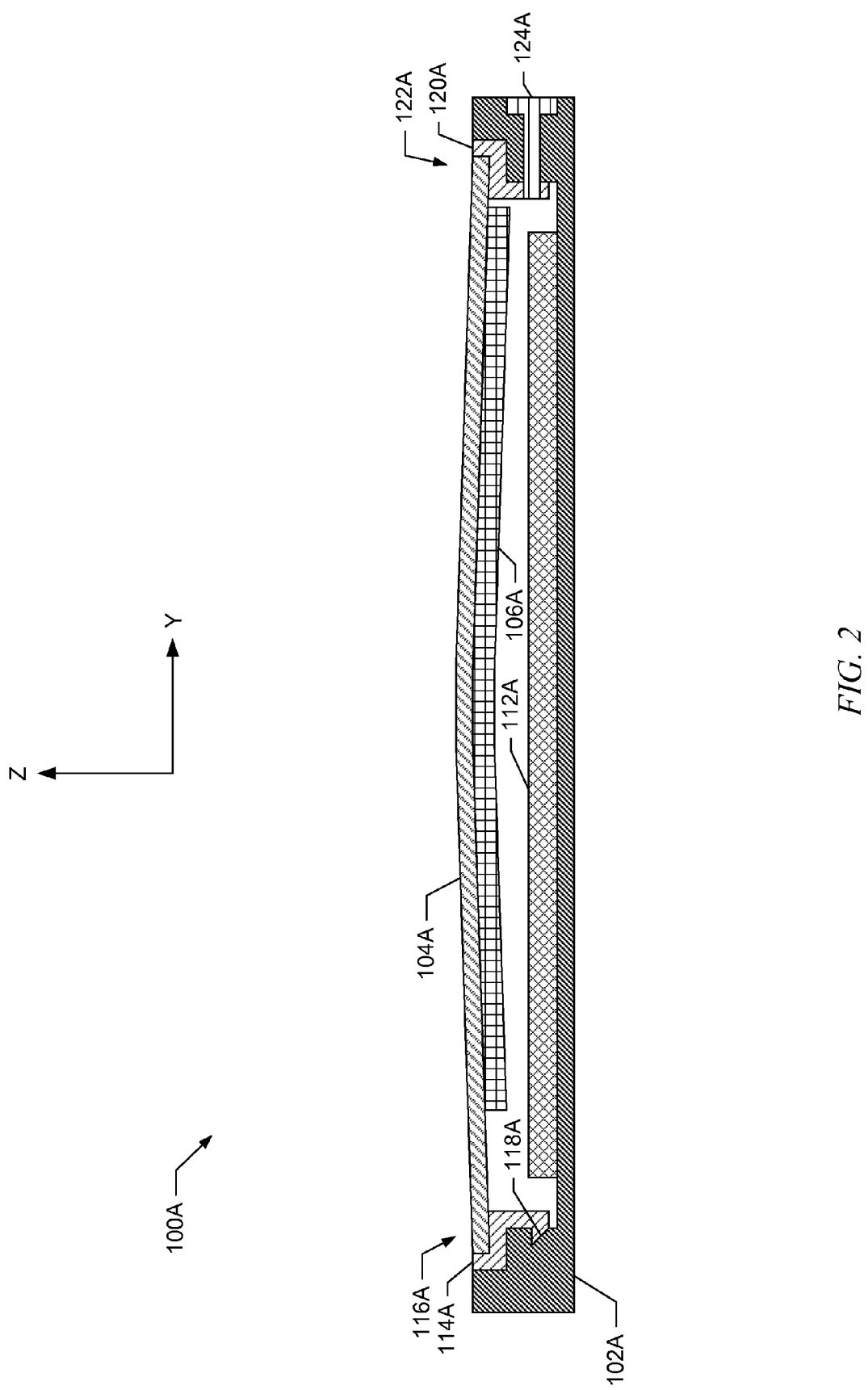
FIG. 2 illustrates a longitudinal sectional view through a first example embodiment of the portable electronic device of FIG. 1 corresponding to a view along line A-A in which the cover panel bows outwardly.

FIGS. 2 illustrates a longitudinal sectional view through a first example embodiment of the portable electronic device 100A corresponding to a view along line A-A from FIG. 1. As illustrated, the portable electronic device 100A may include a housing 102A, a cover panel 104A, and a display 106A. Further, as schematically illustrated in FIG. 2, the portable electronic device 100A may include a plurality of electronic components 112A. The portable electronic device 100A may also include a frame and a button, not visible in FIG. 2, as described above.

The portable electronic device 100A may further comprise an interlocking tab 114A. The interlocking tab 114A may be coupled (e.g., adhered) to a first longitudinal end 116A of the cover panel 104A and engaged with a recess 118A in the housing 102A. Accordingly, the first longitudinal end 116A of the cover panel 104A may be secured to the housing 102A. Further, the portable electronic device 100A may include a receptacle tab 120A coupled (e.g., adhered) to a second longitudinal end 122A of the cover panel 104A. Additionally, a fastener 124A may extend through the housing 102A and engage the receptacle tab 120A to secure the second longitudinal end 122A of the cover panel 104A to the housing.

As illustrated in FIG. 2, due to tolerances associated with manufacturing processes, the cover panel 104A may tend to bow (e.g., curve) outwardly from the housing 102A. In this regard, compressive forces transferred from the housing 102A to the cover panel 104A, which may be substantially flat in an initial unassembled configuration, may cause the cover panel to bow outwardly. In particular, the cover panel 104A may bend about an axis extending perpendicularly to a longitudinal axis of the cover panel. In this regard, the cover panel may bend about the X-axis (see, e.g., FIG. 1) extending laterally across the portable electronic device.

However, it may be desirable for the cover panel to define a substantially flat configuration when assembled to the housing, in which, for example, variation in height of the cover panel (e.g., along the Z-axis) is less than about 0.2 millimeters. In this regard, a substantially flat cover panel may provide benefits in terms of an improved cosmetic appearance. Further, a substantially flat cover panel may allow the electronic device to be securely placed in mating contact with a flat surface such that rocking movement is avoided. Accordingly, embodiments of the present disclosure are directed to electronic devices and assemblies including cover panels that are substantially flat in an assembled configuration.

Figure 3:
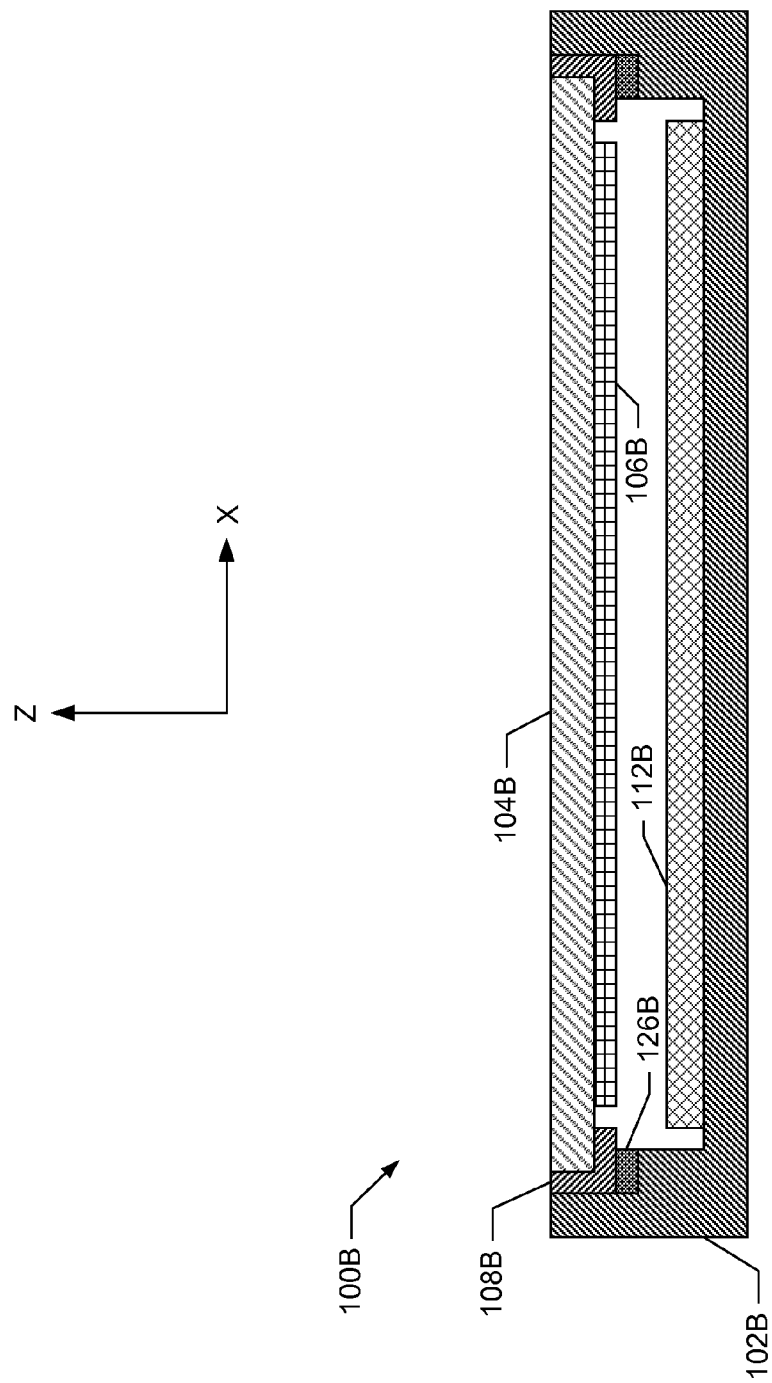
FIG. 3 illustrates a lateral sectional view through a second example embodiment of the portable electronic device of FIG. 1 corresponding to a view along line B-B in which the cover panel is secured to the housing by an adhesive according to an example embodiment of the present disclosure.

In this regard, FIG. 3 illustrates a lateral sectional view through a second example embodiment of the portable electronic device 100B corresponding to a view along line B-B from FIG. 1. As illustrated, the portable electronic device 100B may include a housing 102B, a cover panel 104B, a display 106B, a frame 108B, and a plurality of electronic components 112B. The portable electronic device 100B may also include a button, as described above.

In order to avoid issues with respect to the cover panel 104B bowing outwardly from the housing 102B, the portable electronic device 100B further comprises an adhesive 126B. For example, the adhesive 126B may comprise a pressure sensitive adhesive in some embodiments. As illustrated, the adhesive 126B may be positioned between the frame 108B and the housing 102B and extend at least partially along the longitudinal length of the portable electronic device 100B. Accordingly, the frame 108B may couple to the cover panel 104B and the adhesive 126B may couple the frame to the housing 102B. Thereby, the adhesive 126B and the frame 108B may substantially prevent the cover panel 104B from bowing outwardly from the housing 102B.

Figure 4:
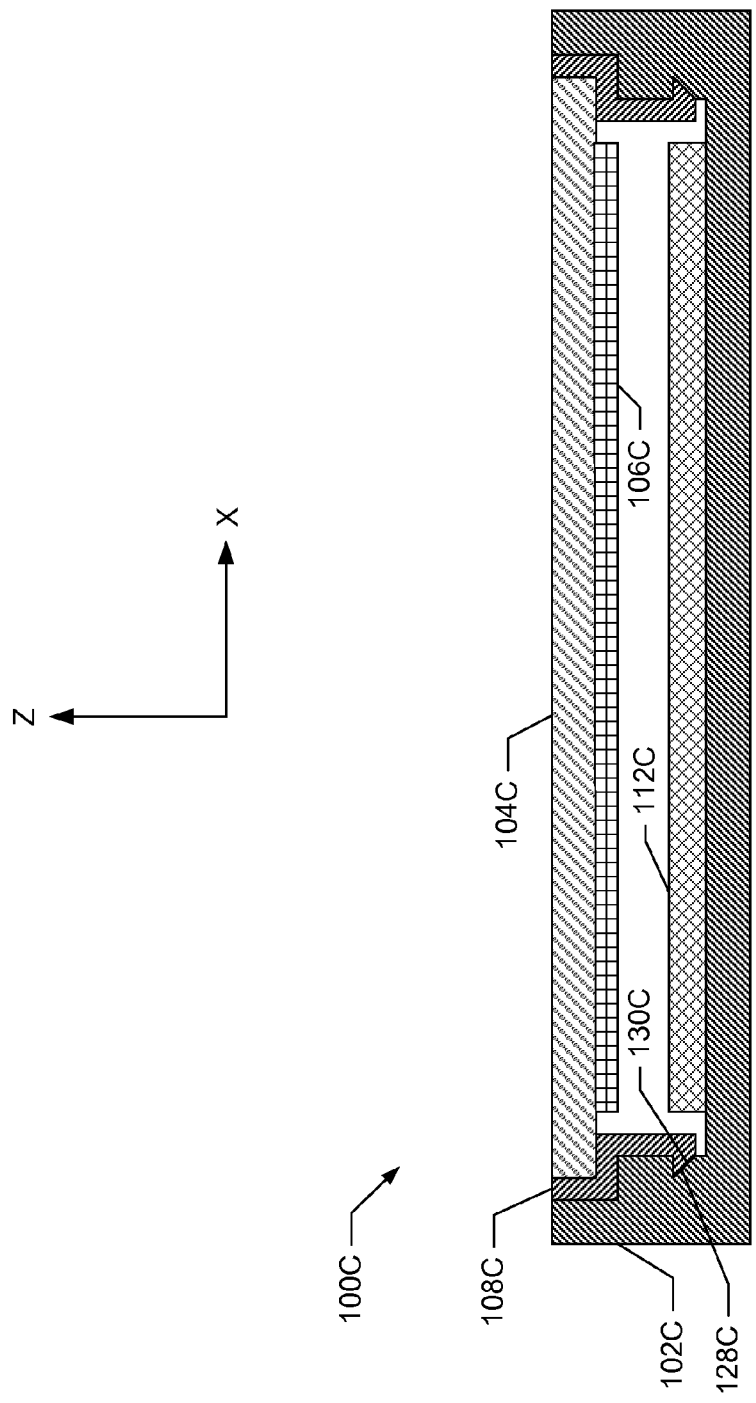
FIG. 4 illustrates a lateral sectional view through a third example embodiment of the portable electronic device of FIG. 1 corresponding to a view along line B-B in which the cover panel is secured to the housing by laterally-positioned interlocking tabs according to an example embodiment of the present disclosure.

FIG. 4 illustrates an alternate embodiment of the portable electronic device 100C including features configured to prevent bowing of a cover panel. More particularly, FIG. 4 illustrates a lateral sectional view through a third example embodiment of the portable electronic device 100C corresponding to a view along line B-B from FIG. 1. As illustrated, the portable electronic device 100C may include a housing 102C, a cover panel 104C, a display 106C, a frame 108C, and a plurality of electronic components 112C. The portable electronic device 100C may also include a button, not visible in FIG. 4, as described above.

In order to avoid issues with respect to the cover panel 104C bowing outwardly from the housing 102C, the portable electronic device 100C further comprises laterally positioned interlocking tabs 128C configured to engage recesses 130C in the housing 102C to form an interference fit therewith. As illustrated, in some embodiments the interlocking tabs 128C may be integral with the frame 108C. However, in other embodiments the interlocking tabs may be separate from the frame. Regardless, the interlocking tabs 128C may be positioned at one or more locations along the longitudinal length of the portable electronic device 100C. Accordingly, the frame 108C may couple to the cover panel 104C and the interlocking tabs 128C may couple the frame to the housing 102C. In another embodiment the interlocking tabs may directly couple the display cover to the housing. Thereby, the interlocking tabs 128C and the frame 108C may substantially prevent the cover panel 104C from bowing outwardly from the housing 102C.

However, the adhesive 126B or the interlocking tabs 128C positioned along the lateral sides of the portable electronic device may present certain issues. In this regard, for example, the adhesive 126B or the interlocking tabs 128C may release under certain circumstances such as during a drop event, such that the cover panel may no longer define a substantially flat configuration. Further, the adhesive 126B or the interlocking tabs 128C occupy space along the lateral edges of the portable electronic device. Thus, inclusion of the adhesive 126B or the interlocking tabs 128C may cause the portable electronic device to define a larger width (e.g., along the X-axis in FIG. 1) and/or a larger height (e.g., along the Z-axis is FIG. 3). Accordingly, embodiments of the present disclosure are configured to provide a substantially flat cover panel in an assembled configuration while avoiding issues with respect to increasing the size of the portable electronic device.

Figure 5:
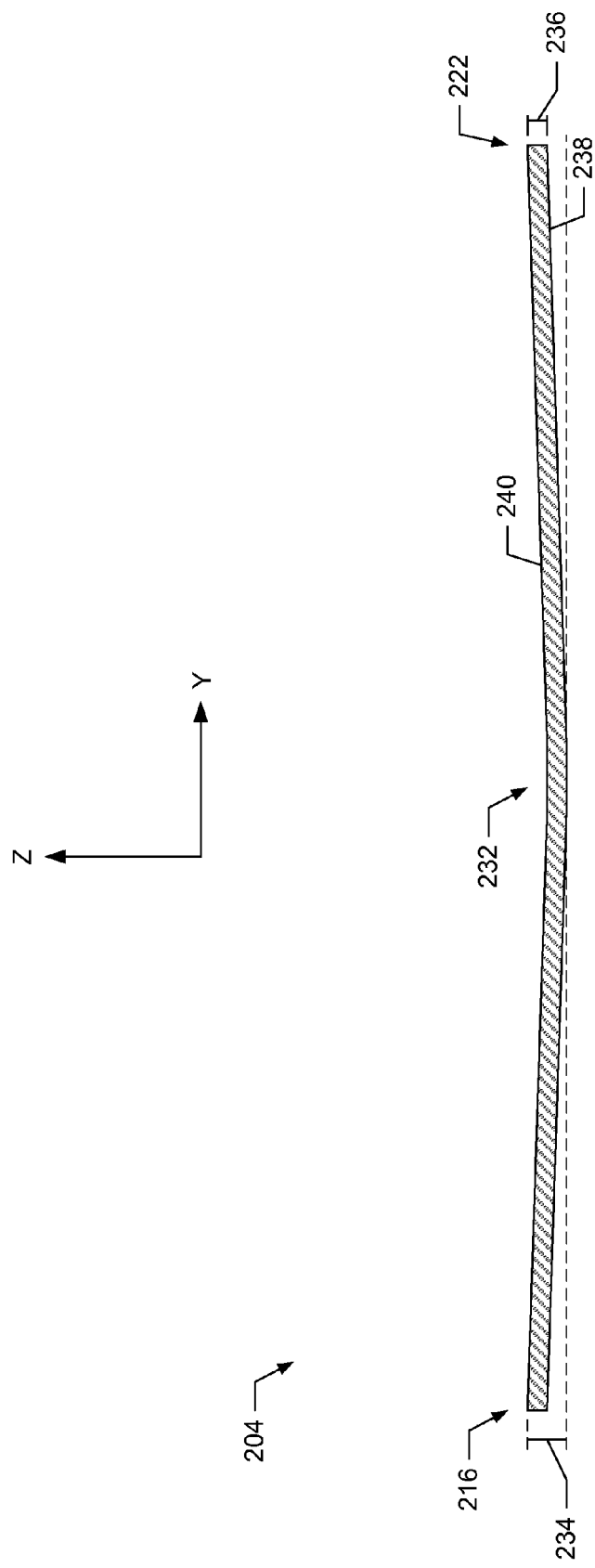
FIG. 5 illustrates a side view of a cover panel defining a pre-bent configuration according to an example embodiment of the present disclosure.

In this regard, FIG. 5 illustrates a longitudinal side view of a cover panel 204 according to an example embodiment of the present disclosure. As illustrated, the cover panel 204 may define a pre-bent configuration. In other words, prior to assembly with a housing, the cover panel 204 may initially be bent. The bend may be formed such that first and second longitudinal ends 216, 222 of the cover panel 204 are at a differing height than a center 232 of the cover panel. In this regard, the bend may be defined about an axis (e.g., into the page in FIG. 5) that is perpendicular to a longitudinal axis (e.g., the Y-axis in FIG. 5) of the cover panel 204.

Thus, a height 234 (e.g., along the Z-axis in FIG. 5) of the cover panel 204 in the pre-bent configuration may be greater than a thickness 236 of the cover panel. In one embodiment the height 234 (e.g., along the Z-axis in FIG. 5) of the cover panel 204 in the pre-bent configuration may be at least about 0.2 millimeters greater than the thickness 236 of the cover panel. More particularly, as illustrated in FIG. 5, the height 234 of the cover panel 204, as used herein, refers to the distance between a minimum height of an inner major surface 238 of the cover panel 204, which may be convex, and a maximum height of an outer major surface 240 of the cover panel, which may be concave.

The extent to which the cover panel 204 is bent depends on the particular characteristics of the portable electronic device 200. For example, a cover panel 204 that is relatively thin (e.g., along the Z-axis in FIG. 5) may require a relatively greater bend in the pre-bent configuration in order to counteract forces after being assembled with a housing. In this regard, a greater bend in the pre-bent configuration may provide a greater biasing force when bent to a substantially flat configuration.

The bend in the cover panel 204 may be formed by a variety of methods. In one embodiment the bend may be formed by chemically strengthening at least one of the inner major surface 238 and the outer major surface 240 of the cover panel to a differing extent. For example, the outer major surface 240 may be chemically strengthened to a greater extent than the inner major surface 238. Increased chemical strengthening at the outer major surface 240 as compared to the inner major surface 238 may cause the outer major surface to be exposed to relatively larger compressive forces as compared to the inner major surface, which may cause the cover panel 204 to bend such that the outer major surface is concave and the inner major surface is convex. In one embodiment a mask may be applied to the inner major surface 238, and no mask may be applied to the outer major surface 240, such that when a chemical strengthening agent is applied to the cover panel 204, the outer major surface is exposed to the chemical strengthening agent to a greater extent than the inner major surface.

However, the pre-bent configuration of the cover panel 204 may be formed via a variety of other methods. For example, the cover panel 204, which may initially define a substantially flat configuration, may be coupled to a frame (e.g., frame 108) that is bent. By coupling the cover panel 204 to a bent frame, the cover panel may also take on and define a bent configuration.

In order to form the bent frame, the frame may be initially formed in a straight configuration and then plastically deformed to the bent configuration. Alternatively, the frame may be manufactured such that it initially defines the bent configuration. For example, the frame may be injection molded, die cast, stamped, or computer numerically control (CNC) manufactured to define the bent configuration.

In another embodiment the cover panel 204 may be initially manufactured in a pre-bent configuration. In this regard, manufacturing the cover panel 204 may comprise one or more of various manufacturing techniques such as grinding, polishing, or application of heat and/or pressure to cause the cover panel to define the three-dimensional pre-bent configuration, as opposed to a substantially flat configuration. Accordingly, the cover panel 204 may define a pre-bent configuration via a variety of methods and manners.

Figure 6:
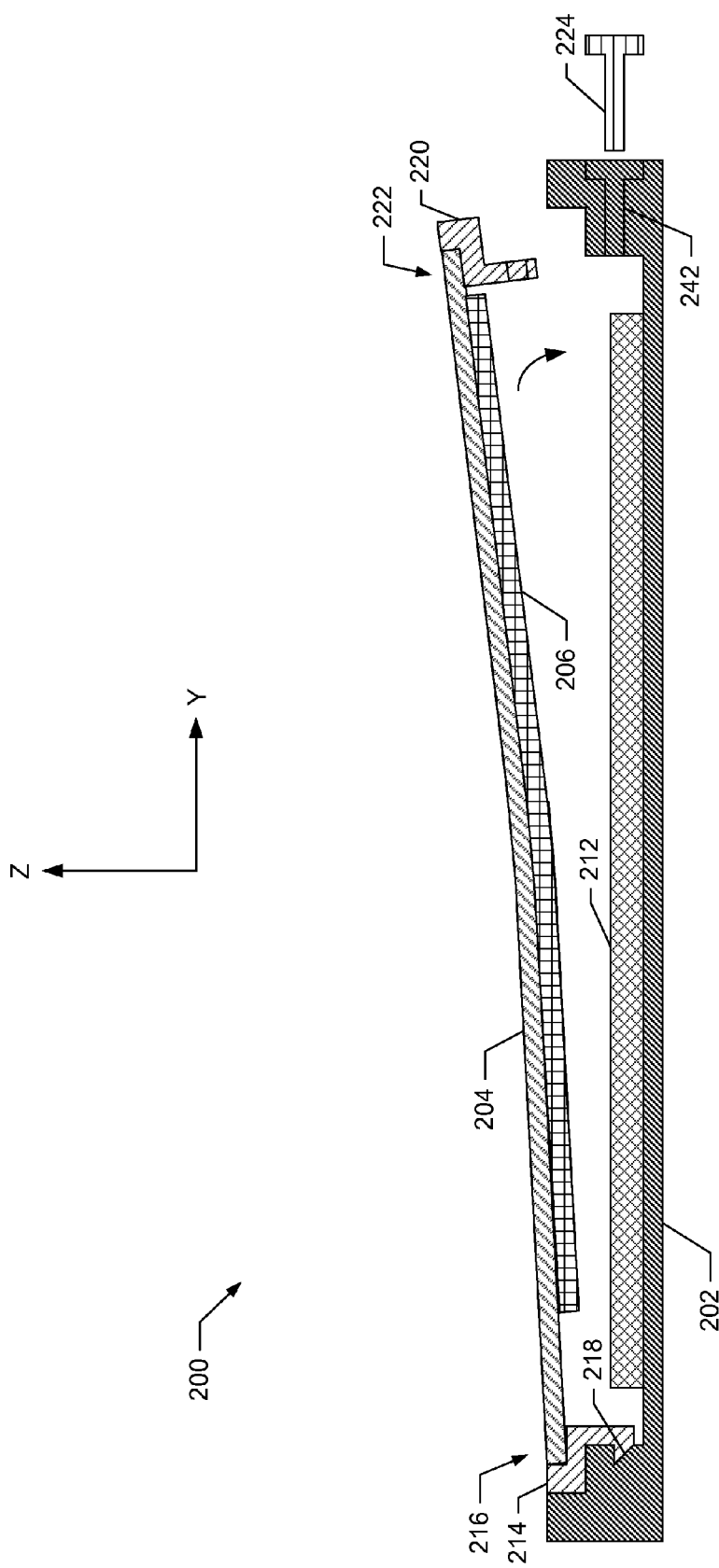
FIG. 6 illustrates a longitudinal sectional view through a fourth example embodiment of the portable electronic device of FIG. 1 corresponding to a view along line A-A in which the pre-bent cover panel of FIG. 5 is partially assembled to the housing.

FIG. 6 illustrates a longitudinal sectional view through a portable electronic device 200 corresponding to a view along line A-A from FIG. 1. More particularly, FIG. 6 illustrates the portable electronic device 200 in a partially assembled configuration in which the cover panel 204 of FIG. 5 is not yet fully attached. As illustrated, the portable electronic device 200 may include the cover panel 204, a housing 202, a display 206, and a plurality of electronic components 212. The portable electronic device 200 may also include a frame 208 (see, e.g., FIG. 8) and a button (see, e.g., button 110 in FIG. 1), as described above.

The portable electronic device 200 may further comprise an interlocking tab 214 and a receptacle tab 220. The interlocking tab 214 may be coupled to the first longitudinal end 216 of the cover panel 204 and the receptacle tab 220 may be coupled to the second longitudinal end 222 of the cover panel. For example, the interlocking tab 214 and the receptacle tab 220 may be adhesively bonded to the cover panel 204. The interlocking tab 214 and the receptacle tab 220 may facilitate attachment of the cover panel 204 to the housing 202.

In this regard, as illustrated in FIG. 6, the interlocking tab 214 may engage a recess 218 in the housing 202. Accordingly, the first longitudinal end 216 of the cover panel 204 may be secured to the housing 202. However, due to the curvature of the cover panel 104 in the pre-bent configuration, the second longitudinal end 222 of the cover panel 204 may not initially align with the housing 202.

Figure 7:
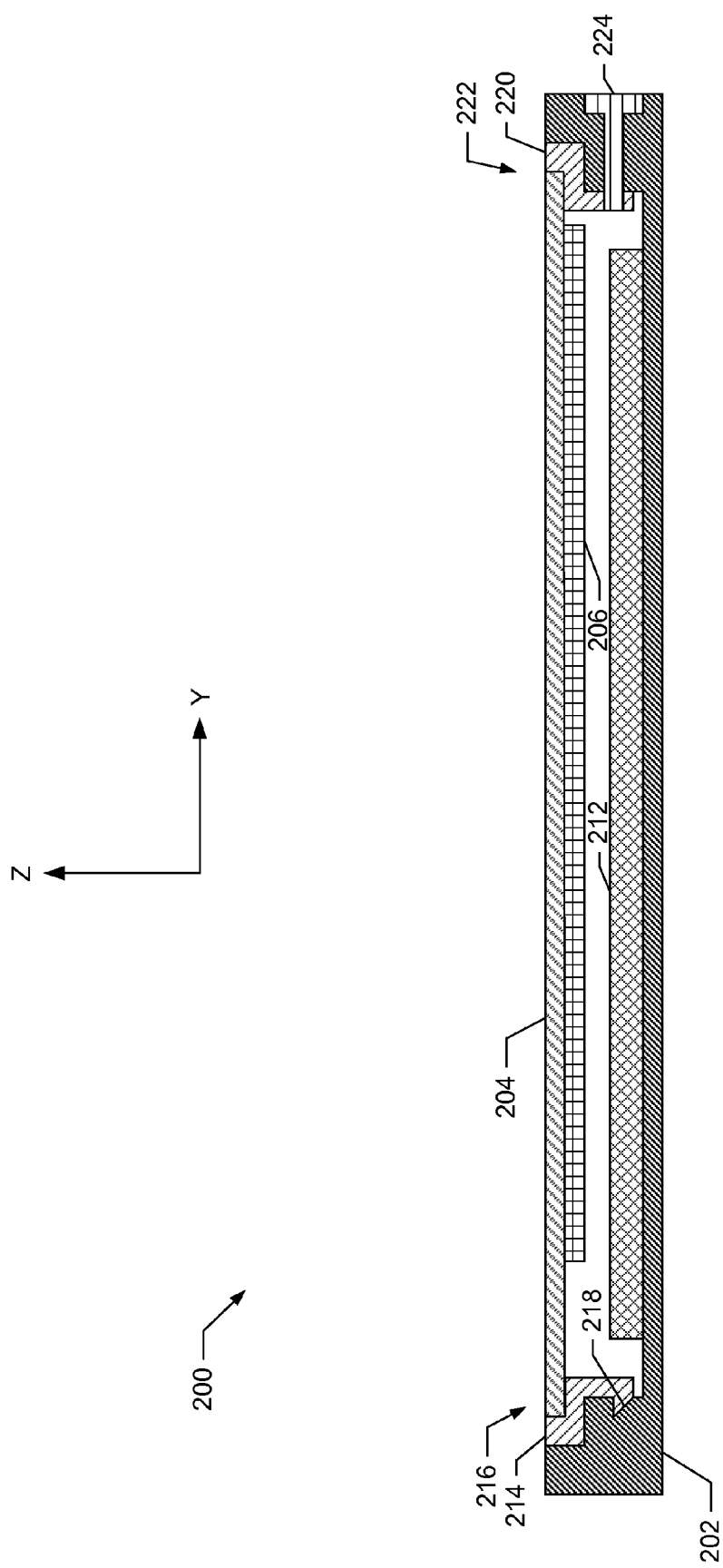
FIG. 7 illustrates a longitudinal sectional view through the fourth example embodiment of the portable electronic device of FIG. 1 corresponding to a view along line A-A in which the pre-bent cover panel of FIG. 5 is fully assembled to the housing.

Accordingly, the cover panel 204 may be elastically bent from the pre-bent configuration illustrated in FIGS. 5 and 6 to define a substantially flat configuration, illustrated in FIG. 7, in which the first longitudinal end 216 and the second longitudinal end 222 of the cover panel are secured to the housing 202. In particular, as noted above, the first longitudinal end 216 of the cover panel 204 may be secured to the housing 202 by engagement of the interlocking tab 214 with the recess 218 in the housing. Further, the second longitudinal end 222 of the cover panel 204 may be secured to the housing 202 by a fastener 224 extending through an aperture 242 (see, e.g., FIG. 6) in the housing and engaging the receptacle tab 220 to retain the cover panel in the substantially flat configuration.

In some embodiments the outer major surface 240 of the cover panel 204 may be in tension and the inner major surface 238 of the cover panel may be in compression when the cover panel is in the substantially flat state. In this regard, in some embodiments the cover panel 204 may define the pre-bent configuration illustrated in FIG. 5 without the aid of external structures. For example, as described above, the cover panel 204 may be manufactured to define the pre-bent configuration or subjected to chemical strengthening which causes the cover panel to define the pre-bent configuration. Thus, when the cover panel 204 is bent from the pre-bent configuration, tension may be applied to the outer major surface 240, whereas compression may be applied to the inner major surface 238. In contrast, in embodiments in which an external structure such as the frame 208 causes the cover panel 204 to define the pre-bent configuration, the inner major surface 238 and the outer major surface 240 may not be subjected to tensile or compressive forces as a result of being bent to the substantially flat configuration. However, the external structure (e.g., the frame 208) causing the cover panel 204 to initially define the pre-bent configuration may be subjected to tension at an outer surface and compression at an inner surface when bent to define the substantially flat configuration.

Figure 8:
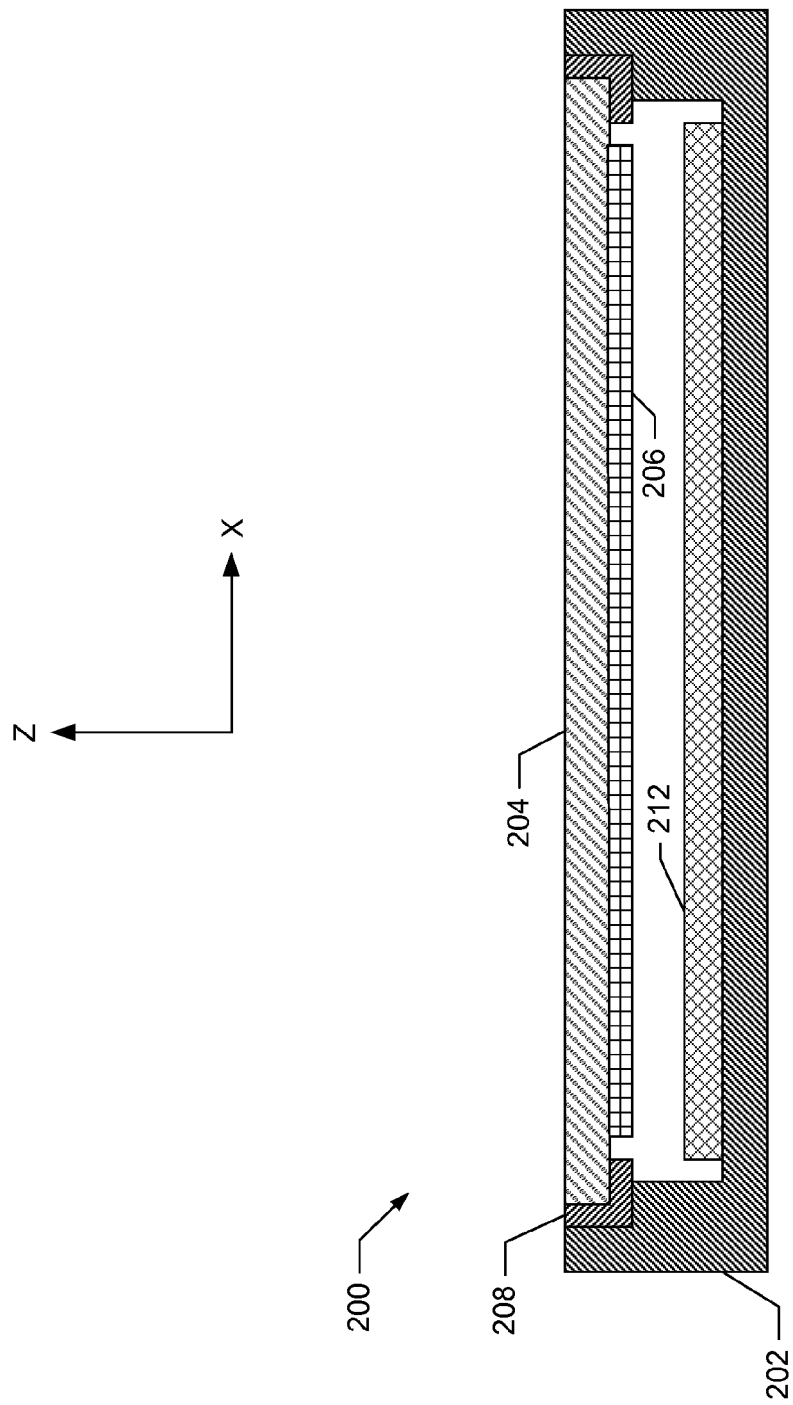
FIG. 8 illustrates a lateral sectional view through the fourth example embodiment of the portable electronic device of FIG. 1 corresponding to a view along line B-B in which the pre-bent cover panel is fully assembled to the housing according to an example embodiment of the present disclosure.

Thus, by maintaining the cover panel 204, or an external structure attached thereto (such as the frame 208), in a state of tension at an outer surface and a state of compression at an inner surface, the cover panel may resist bowing outwardly. Accordingly, as illustrated in FIG. 8, the cover panel 204 may remain in close contact with the frame 208, which may remain in close contact with the housing 202. Note that in alternate embodiment the frame may not be employed, such that the cover panel may directly engage the housing.

Accordingly, embodiments of the present disclosure may provide a portable electronic device 200 including a substantially flat cover panel 204 in the assembled configuration. Further, the cover panel 204 may be secured to the housing 202 only at the first longitudinal end 216 and the second longitudinal end 222 thereof. Accordingly, as illustrated in FIG. 8, no adhesive, interlocking tabs, or other features may be employed along the lateral edges of the portable electronic device in order to retain the cover panel 204 in the substantially flat configuration. Accordingly, the width (e.g., along the X-axis in FIG. 8) and/or the height (e.g., along the Z-axis in FIG. 8) of the portable electronic device 200 may be reduced in comparison to embodiments of portable electronic devices employing such features. Thereby, the overall size of the portable electronic device may be reduced and/or the size of a border around the display may be reduced. For example, the border around the display (e.g., the distance from the edge of the display to the edge of the housing) may be reduced from about 4 millimeters to less than about 1 millimeter in some embodiments.

Further, by avoiding use of adhesive and/or additional interlocking tabs or other mechanical features, assembly, disassembly, and reassembly of the portable electronic device may be facilitated. Additionally, resistance to damage during drop events may be improved. In this regard, the interface between the cover panel and the housing may not include glue or adhesive that could delaminate in a drop event. Additionally, by avoiding use of adhesive and/or additional interlocking tabs or other mechanical features, issues with respect to the cover panel being positioned flush with the housing may be avoided, since there is a reduction in the number of parts stacked along the thickness (e.g., along the Z-axis in FIGS. 7 and 8) of the portable electronic device.

Figure 9:
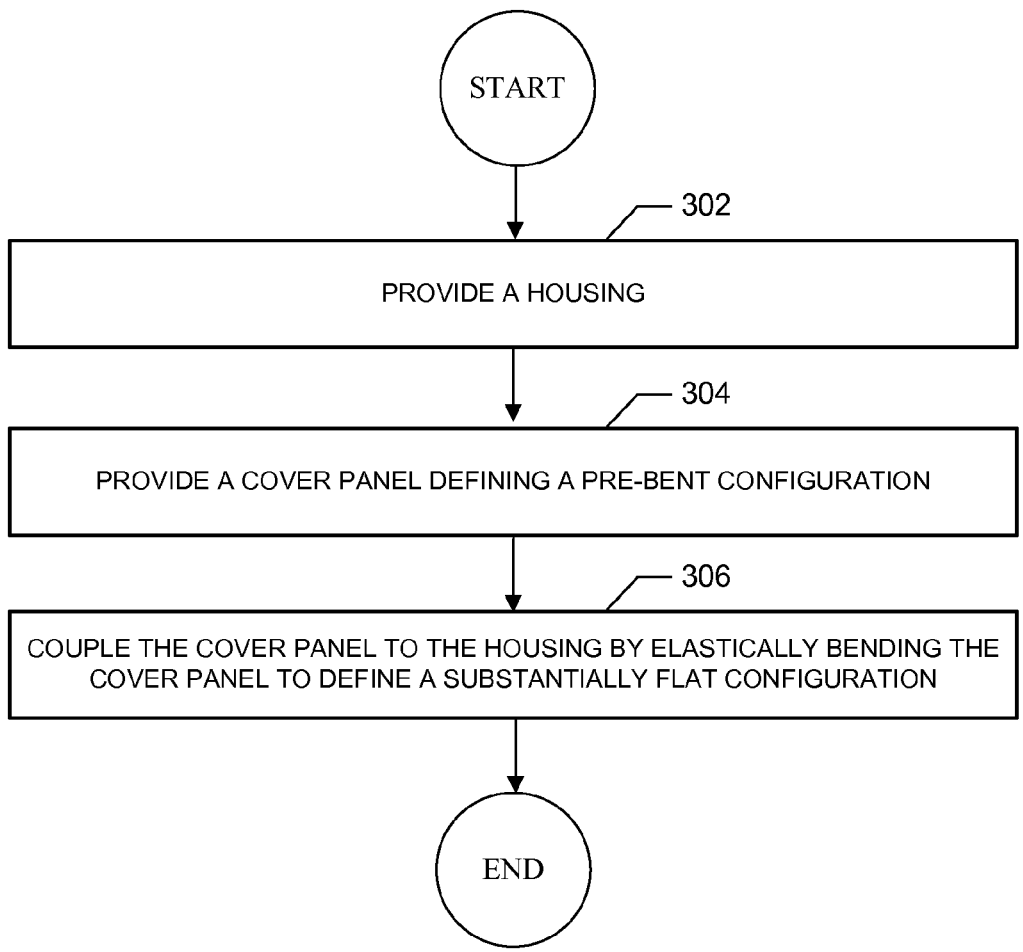
FIG. 9 schematically illustrates a method for manufacturing according to an example embodiment of the present disclosure.

A related method for manufacturing is also provided. As illustrated in FIG. 9, the method may include providing a housing at operation 302. Further, the method may include providing a cover panel defining a pre-bent configuration at operation 304. The method may additionally include coupling the cover panel to the housing by elastically bending the cover panel to define a substantially flat configuration at operation 306.

In some embodiments the method may further comprise forming a bend in the cover panel to define the pre-bent configuration. The bend may be defined about an axis that is perpendicular to a longitudinal axis of the cover panel. Forming the bend may comprise chemically strengthening at least one of an inner major surface and an outer major surface of the cover panel to a differing extent in one embodiment. In another embodiment forming the bend may comprise coupling the cover panel to a bent frame. In an additional embodiment forming the bend may comprise manufacturing the cover panel in the pre-bent configuration. Further, in some embodiments coupling the cover panel to the housing at operation 306 may comprise securing the cover panel to the housing at a first longitudinal end and a second longitudinal end of the cover panel.

Figure 10:
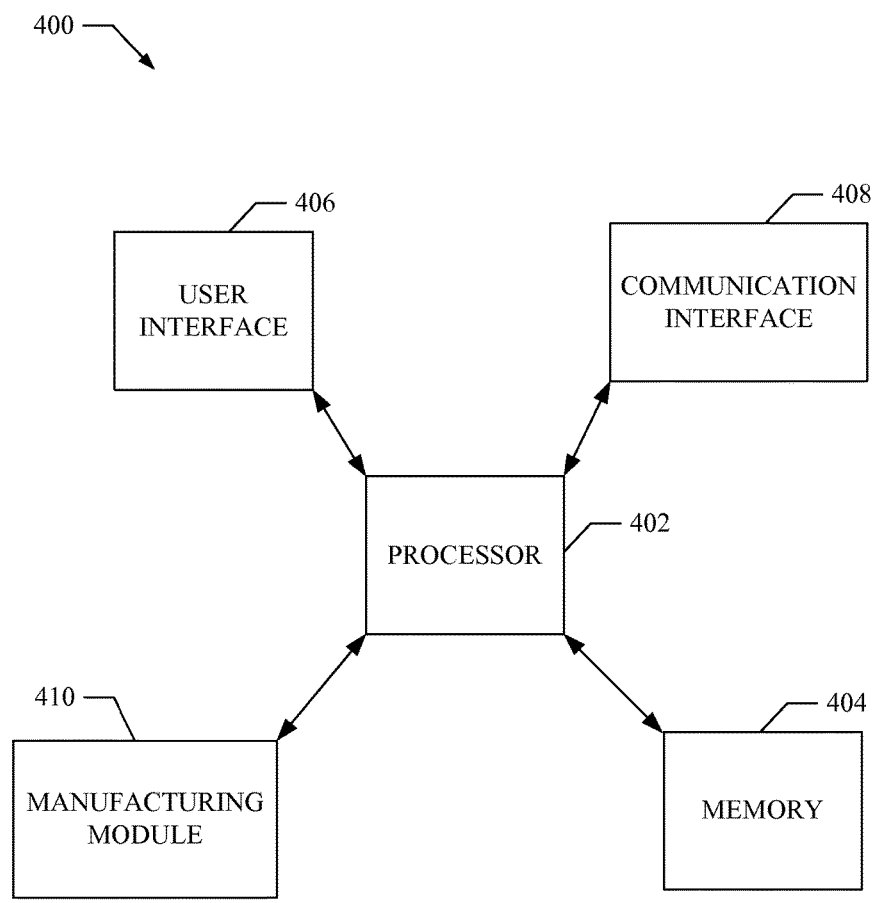
FIG. 10 schematically illustrates a block diagram of an electronic device according to an example embodiment of the present disclosure.

FIG. 10 is a block diagram of an electronic device 400 suitable for use with the described embodiments. In one example embodiment the electronic device 400 may be embodied in or as a controller configured for controlling the manufacturing operations as disclosed herein. In this regard, the electronic device 400 may be configured to control or execute bending of the cover panel to define the pre-bent configuration and assembly operations as described above.

The electronic device 400 illustrates circuitry of a representative computing device. The electronic device 400 may include a processor 402 that may be microprocessor or controller for controlling the overall operation of the electronic device 400. In one embodiment the processor 402 may be particularly configured to perform the functions described herein relating to manufacturing and assembling portable electronic devices. The electronic device 400 may also include a memory device 404. The memory device 404 may include non-transitory and tangible memory that may be, for example, volatile and/or non-volatile memory. The memory device 404 may be configured to store information, data, files, applications, instructions or the like. For example, the memory device 404 could be configured to buffer input data for processing by the processor 402. Additionally or alternatively, the memory device 404 may be configured to store instructions for execution by the processor 402.

The electronic device 400 may also include a user interface 406 that allows a user of the electronic device 400 to interact with the electronic device. For example, the user interface 406 can take a variety of forms, such as a button, keypad, dial, touch screen, audio input interface, visual/image capture input interface, input in the form of sensor data, etc. Still further, the user interface 406 may be configured to output information to the user through a display, speaker, or other output device. A communication interface 408 may provide for transmitting and receiving data through, for example, a wired or wireless network such as a local area network (LAN), a metropolitan area network (MAN), and/or a wide area network (WAN), for example, the Internet.

The electronic device 400 may also include a manufacturing module 410. The processor 402 may be embodied as, include or otherwise control the manufacturing module 410. The manufacturing module 410 may be configured for controlling or executing the manufacturing and assembly operations as discussed herein.

In this regard, for example, in one embodiment a computer program product comprising at least one computer-readable storage medium having computer-executable program code portions stored therein is provided. The computer-executable program code portions, which may be stored in the memory device 404, may include program code instructions for performing the methods disclosed herein. For example, the computer program product may include program code instructions for providing a housing, program code instructions for providing a cover panel defining a pre-bent configuration, and program code instructions for coupling the cover panel to the housing by elastically bending the cover panel to define a substantially flat configuration.

In some embodiments the program code instructions may additionally include program code instructions for forming a bend in the cover panel to define the pre-bent configuration. The program code instructions for forming the bend may include program code instructions for forming the bend about an axis that is perpendicular to a longitudinal axis of the cover panel. Further, program code instructions for forming the bend may comprise program code instructions for chemically strengthening at least one of an inner major surface and an outer major surface of the cover panel to a differing extent. In another embodiment the program code instructions for forming the bend may include program code instructions for coupling the cover panel to a bent frame. In an additional embodiment the program code instructions for forming the bend may include program code instructions for manufacturing the cover panel in the pre-bent configuration. Further, the program code instructions for coupling the cover panel to the housing may comprise program code instructions for securing the cover panel to the housing at a first longitudinal end and a second longitudinal end of the cover panel.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An electronic device comprising:
  a housing comprising:
    a first sidewall along a width of the electronic device;
    a second sidewall parallel to the first sidewall;
    a third sidewall along a length of the electronic device, the length greater than the width; and
    a fourth sidewall parallel to the third sidewall;
  a glass cover panel removably coupled with the housing, wherein:
    the glass cover panel, when uncoupled from the housing, defines:
      a first major surface having a concave shape; and
      a second major surface opposite the first major surface and having a convex shape;
    the glass cover panel, when coupled to the housing, is maintained in a substantially flat configuration in response to a bending force produced on the second major surface of the glass cover panel by the third sidewall and the fourth sidewall of the housing, respectively;
    the glass cover panel is removably coupled with the housing by:
      an interlocking tab coupled with a first end of the glass cover panel and engaged with a recess in the first sidewall; and
      a receptacle tab coupled to a second end of the glass cover panel and engaged with the second sidewall by a fastener extending through the second sidewall; and
    when the glass cover panel is uncoupled from the housing, a first pair of sides that are parallel with the width of the electronic device are straight and a second pair of sides that are parallel with the length of the electronic device are bent, thereby defining the concave shape of the first major surface and the convex shape of the second major surface; and
    the second pair of sides are bent due to a chemical strengthening process applied to the second major surface of the glass cover panel; and
  a display coupled to the second major surface of the glass cover panel.

2. The electronic device of claim 1, further comprising a frame positioned between the glass cover panel and the housing.

3. The electronic device of claim 1, wherein the glass cover panel is secured to the interlocking tab of the housing after the glass cover panel is bent into the substantially flat configuration.

4. The electronic device of claim 1, wherein the first major surface of the glass cover panel is in tension and the second major surface of the glass cover panel is in compression in the substantially flat configuration.

5. The electronic device of claim 4, wherein a height of the glass cover panel when the glass cover panel is uncoupled from the housing is about 0.2 millimeters greater than a thickness of the glass cover panel.

6. A portable electronic device, comprising:
a housing defining an interior cavity; and
a glass cover panel defining:
  a first pair of sides extending along a width of the portable electronic device;
  a second pair of sides extending along a length of the portable electronic device, the length greater than the width;
  a first surface defining an exterior surface of the portable electronic device and having a concave shape when the glass cover panel is uncoupled from the housing; and
  a second surface facing the interior cavity and having a convex shape when the glass cover panel is uncoupled from the housing; and
a display coupled to the second surface of the glass cover panel;
wherein:
the glass cover panel is secured to the housing while the glass cover panel is forced into a substantially flat configuration at least in part by a sidewall of the housing;
the first surface of the glass cover panel is in tension; and
the second surface of the glass cover panel is in compression in the substantially flat configuration; and
when the glass cover panel is uncoupled from the housing, the first pair of sides are straight and the second pair of sides are bent, thereby defining the concave shape of the first surface and the convex shape of the second surface;
the second pair of sides are bent due to a chemical strengthening process; and
the chemical strengthening process comprises applying a chemical strengthening compound only to the second surface.

7. The portable electronic device of claim 6, further comprising a frame positioned between the glass cover panel and the housing.

8. The portable electronic device of claim 6, wherein the glass cover panel is secured to an interlocking tab of the housing after the glass cover panel is bent into the substantially flat configuration.

9. The portable electronic device of claim 6, wherein a height of the glass cover panel when the glass cover panel is uncoupled from the housing is 0.2 millimeters greater than a thickness of the glass cover panel in the substantially flat configuration.

10. The electronic device of claim 1, further comprising bottom wall, wherein the first sidewall and the second sidewall extend from the bottom wall, and wherein the recess defines an indention in the first sidewall.

11. The electronic device of claim 10, wherein the interlocking tab faces the indention when engaged with the indention.

12. The portable electronic device of claim 6, wherein:
the second pair of sides are bent due to a chemical strengthening process; and
the chemical strengthening process comprises strengthening the second surface and the first surface to a different extent.

13. A method of manufacturing a portable electronic device having a thickness, a width greater than the thickness, and a length greater than the width, the method comprising:
bending a glass member of a cover assembly to form a bent glass member defining a first surface having a concave shape and a second surface opposite the first surface and having a convex shape, the cover assembly comprising:
  a first tab along a first side of the cover assembly; and
  a second tab along a second side of the cover assembly;
attaching a display to the second surface;
attaching the first side of the cover assembly to a housing by engaging the first tab of the cover assembly with a recess in the housing, the attaching resulting in the second side of the cover assembly being separated from the housing due to the concave shape of the first surface;
forcing the cover assembly against at least two parallel side walls of the housing that extend along the length of the portable electronic device, thereby flattening the bent glass member and causing the second side of the cover assembly to engage the housing; and
securing the second tab to the housing with a fastener, thereby maintaining the glass member in a flat configuration;
wherein:
the first surface of the glass member defines an exterior surface of the portable electronic device; and
bending the glass member comprises chemically strengthening the second surface of the glass member.

14. The method of claim 13, wherein the bent glass member has a height that is 0.2 mm greater than a thickness of the bent glass member.

* * * * *